3,843,509
METHOD OF CATALYTIC CONVERSION OF HEAVY HYDROCARBON OILS
Munehisa Suto, Tokyo, Takuji Itoh, Nobuaki Tagaya, and Takashi Obayashi, Saitama, Japan, assignors to Toa Nenryo Kogyo Kabushiki Kaisha
Filed Dec. 22, 1972, Ser. No. 317,714
Claims priority, application Japan, Jan. 6, 1972, 47/4,403
Int. Cl. C10g 13/02, 23/02
U.S. Cl. 208—111                  7 Claims

ABSTRACT OF THE DISCLOSURE

A process is described for the catalytic conversion of heavy hydrocarbon oils comprising contacting the oil with hydrogen in the presence of a conversion catalyst containing a Group VI and/or VIII metal supported on a carrier preferably comprising silica and alumina, the catalyst having the following structural characteristics:

(1) the silica ($SiO_2$) content is 0 to 30% by weight of the total amount of an alumina-containing carrier, (2) the volume of the pores having a radius in the range from 0 to 300 A. is greater than 0.30 ml./g.

(3) the volume of the pores having a radius in the range from 0 to 30 A. is less than 25% of the volume of the pores having a radius in the range from 0 to 300 A., (4) the volume of the pores having a radius in the range from 75 to 300 A. is less than 40% of the volume of the pores having a radius in the range from 0 to 300 A., (5) the volume of the pores having a radius in the range from 75 to 75,000 A. is smaller than 0.25 ml./g.

BACKGROUND OF THE INVENTION

Field of the Invention

This invention relates to a method for catalytic conversion of hydrocarbon oils and more particularly to a method for *hydrocracking* of heavy hydrocarbon oils in the presence of a novel catalyst. Still more specifically, the invention concerns a method for performing catalytic conversion of heavy hydrocarbon oils by reacting them with hydrogen in the presence of a catalyst having a novel pore structure. Still more specifically, the process provides a novel method for effective accomplishment of ring-scission reaction of the condensed ring compounds present in a heavy hydrocarbon oil, removal of sulfur and nitrogen compounds, and hydrocracking of such compounds.

DESCRIPTION OF THE PRIOR ART

Heretofore, for catalytically converting or refining hydrocarbon oils, it has been a common practice to use a caatlyst obtained by carrying a metal component of Group VIII and/or Group VI of the Periodic Table (as described in "The Encyclopedia of Chemistry," Reinhold Publishing Corporation, 2nd Edition (1966) at page 526 on a catalyst carrier such as silica and/or alumina, after or without subjecting such catalyst to a sulfiding treatment with a sulfur compound. It has been most common to use cobalt, nickel, molybdenum, tungsten or the like selected from metals of Group VIII or VI of the Periodic Table as a hydrogenating component. Such metals are used as oxides or sulfides described above.

However, as regards the catalyst carriers having acidity and activity for hydrocarbons, the catalytic performance of such carriers is affected by various factors such as, for example, the raw material used, producing method, pore structure, etc., and there are still many problems remaining unsolved in this regard.

The pore structure of the catalyst used plays a very important role in a heterogeneous reaction of hydrocarbons and proves a major factor that affects the catalyst performance.

Many studies and efforts have been made in the past toward realizing improvement of such pore structure in the catalyst, and the results of such studies have been presented in applications for catalytic conversion or refining of hydrocarbon oils. Among the typical examples of heretofore proposed metods are, for instance, a method wherein a catalyst, in which the pores of greater than $0.05\mu$ (500 A.) in diameter assume 40 to 70% of the total pore volume, and in which the pores of from 0.05 to $1\mu$ (500 to 10,000 A.) in diameter account for more than 30%, is used for the purpose of producing gas oils having a high diesel index by using a heavy oil as raw material; a method wherein a catalyst in which the volume of the pores greater than 80 A. in radius is restricted to less than 10% of the total pore volume is used for preventing ingress of asphalt or metal-containing compounds in the residue in sulfur-bearing residue hydrodesulfurization; and a method wherein a catalyst in which the pores of less than 120 A. in radius are relatively uniformly distributed is used in abovesaid hydrodesulfurization of sulfur-containing residual oils.

However, none of these methods discloses all the cases involving distribution of the pores of greater than 300 A. in radius, and the influences derived therefrom are ignored. Also, no proposal suggestive of utilization of such methods for production of lubricating oils having a high viscosity index has been made.

SUMMARY OF THE INVENTION

The present invention provides a novel method for catalytic conversion of heavy hydrocarbon oils characterized in that a heavy hydrocarbon oil is contacted with hydrogen under the catalytic conversion reaction conditions in the presence of a specific catalyst for promoting such conversion reaction, said catalyst being specific in that:

(1) the silica ($SiO_2$) content is about 0 to about 30% by weight of the amount of an alumina-containing carrier, (2) the volume of the pores having a radius in the range of from about 0 to about 300 A. is greater than about 0.30 ml/g.

(3) the volume of the pores having a radius in the range of from about 0 to about 30 A. is less than about 25% of the volume of the pores having a radius in the range of from about 0 to about 300 A., (4) the volume of the pores having a radius in the range of from about 75 to about 300 A. is less than about 40% of the volume of the pores having a radius in the range of from about 0 to about 300 A., and (5) the volume of the pores having a radius in the range of from about 75 to about 75,000 A. is smaller than about 0.25 ml./g.

The present invention relates to the surprising finding that a catalyst having a specific pore structure proves extremely effective in hydrocarbon conversion reactions, particularly for obtaining a lubricating oil fraction having a high viscosity index by hydrocracking of heavy hydrocarbon oils.

The catalytic conversion process is based on the finding that the volume of the pores ranging from about 75 to about 75,000 A. in radius in the catalyst has an important bearing on the bulk density and mechanical strength of the catalyst, which in turn has an important effect on the catalyst activity. Thus it has been found that if the volume of the pores of from about 75 to about 75,000 A. in radius is restricted to less than about 0.25 ml./g., particularly less than about 0.18 ml./g., the bulk density of the catalyst is increased to higher than about 0.60 g./ml. and also mechanical strength of the catalyst is markedly improved.

Particularly, the volume of the pores having a radius of from about 75 to about 300 A. greatly affects the bulk density, and if the volume of the pores of from about 75 to about 300 A. in radius is greater than about 0.10 ml./g., it is found difficult to raise the bulk density to higher than about 0.60 g./ml., though such is influenced to some extent by the amount of metal elements carried, configuration of the catalyst used and other like factors.

Therefore, in order to prevent asphalt and resin components in the heavy hydrocarbon oil from entering the pores in the catalyst to cause decrease in its catalytic activity, it is necessary to reduce the volume of the pores within the range of from about 75 to about 75,000 A. in radius.

It is generally known that the solid acids such as silica and alumina can provide a catalyst effective for cracking or denitrification reaction of heavy hydrocarbon oils. In this case, however, it is essential to provide a solid acid suited for hydrogenation or hydrocracking conditions. To this end, it has been usually practiced to control the acidity by adjusting the silica content.

The activity and selectivity of the catalyst for the catalytic conversion reaction, particularly hydrocracking reaction, of heavy hydrocarbon oils can be adjusted by specifying the pore size distribution of the catalyst besides making suitable adjustment of its cracking activity based on acidity control by regulation of the silica content. For instance, for producing a lubricating oil having a high viscosity index by hydrocracking of a heavy hydrocarbon oil, it needs to produce a high-boiling-point hydrocarbon having a mono- or bi-cyclic compound with alkyl side chain by utilizing a ring-scission reaction of a polycyclic aromatic hydrocarbon or a hydrocarbon having a condensed ring. In this connection, the present inventors have found that it is important to reduce the distribution of the pores smaller than about 30 A. in radius in the catalyst for allowing selective performance of ring-scission reactions of the condensed ring compounds in comparison with scission of the carbon-carbon bonds in the saturated chain hydrocarbons.

Such selectivity proves a very important factor for successful performance of the reaction because it allows reduction of hydrogen consumption in removing the sulfur and nitrogen components in the heavy hydrocarbon oil and also prevents lowering of the catalyst activity caused by deposition of carbons in the cracking reaction.

In petroleum refining that is conducted by catalytic conversion, particularly hydrocracking, hydrodesulfurization or hydrodenitrification, of a heavy hydrocarbon oil, it is essential for checking increase of hydrogen consumption or generation of cokes in the excess cracking reaction to restrict the silica content in the silica-alumina carrier to less than about 30% by weight and to also reduce the volume of the pores having a radius of smaller than about 30 A. to less than about 25% of the volume of the pores having a radius of from about 0 to about 300 A.

The heavy hydrocarbon oils used in the present invention may be vacuum distillates and residues or reduced crudes which may or may not have been subjected to a solvent-refining treatment such as deasphalting or dearomatization. It is also possible to use the extracts obtained from solvent extraction of the lubricating oil base stocks (by using a solvent having selective solvent power to aromatic hydrocarbons) or to use "cycle oils" produced by catalytic cracking process. These raw oils may be used in admixture for performing desired hydrocracking reactions. The catalysts used for catalytic conversion of hydrocarbon oils according to the present invention can be prepared by supporting a metal of Group VIII and/or a metal of Group VI of the Periodic Table, either by impregnation, co-precipitation or kneading method, on a carrier which has been prepared by introducing an oxycarboxylic acid or its salt or an aminodicarboxylic acid or its salt into the system when precipitating or ageing the hydrates from the base material of alumina or silica.

The silica content in the carrier may be suitably selected according to the type of the reaction to be carried out, but usually it is within the range of from about 0 to about 30% by weight, preferably from 1 to 30% and, for best results, from about 10 to about 25% by weight.

The base materials of silica and alumina used in the present invention may be, for example, soluble silicon-containing compounds such as alkali metal silicates (where preferably $Na_2O:SiO_2=1:2$ to $1:4$), tetraalkoxy-silane, orthosilicic acid ester, etc.; sulfates, nitrates or chlorides of aluminum, alkali metal aluminates, or inorganic or organic salts of alkoxides or the like. For precipitating the hydrates of silica and/or alumina from a solution of such starting materials, a suitable acid or base is added and the pH is set within the range from about 6.0 to about 11.0. Precipitation and ageing are carried out with heating by adding an acid or a base under reflux so as to prevent evaporation of the treating liquid and change of pH. The remainder of the catalyst-producing process is the same as the commonly employed ones, including the filtering, drying and calcination steps. The carrier may also be added with magnesia, titania, zirconia or the like. For instance, addition of magnesia reduces the strong acid sites while at the same time increases the weak acid sites of silica-alumina to improve selectivity of the catalyst. The amount of such additive added is usually within the range of from about 1 to about 30 % by weight.

The carried metals having hydrogenating activity, which are used in the present invention, are selected from the metals in Group VIII and Group VI of the Periodic Table, such as iron, cobalt, nickel, palladium, platinum, rhodium, iridium, chromium, molybdenum, tungsten, etc., and these metals may be used either singly or in combination. In the hydrocracking process for producing lubricating oil, the nickel-molybdenum, cobalt-molybdenum or nickel-tungsten combination is most preferred. Such catalytic metals are used in the form of oxides or sulfides formed from pre-sulfiding. The amount of metals to be carried is preferably within the range of from about 0.1 to about 20% (by weight), calculated as against the amount of the catalyst, in the case of the metals of Group VIII, and from about 5 to about 20% (by weight) in the case of the metals of Group VI.

The catalytic conversion according to the present invention is characterized by scission of the carbon-carbon or carbon-sulfur or carbon-nitrogen bonds in hydrocarbon oil, and involves the hydrocracking, desulfurization or denitrification reactions. It is best suited for hydrocracking reactions, particularly, for production of lubricating oil fractions having a high viscosity index by using heavy hydrocarbon oils as starting materials.

The catalytic conversion conditions can be suitably selected according to the type of raw oil used, desired quality of the oil to be produced and other like factors, but in the case of the hydrocracking, the following reaction conditions are usually employed: temperature within the range of from about 300 to about 450° C., preferably from about 350 to about 430° C.; pressure of from about 50 to about 300 kg./cm.$^2$, preferably from about 150 to about 250 kg./cm.$^2$; liquid hourly space velocity of from about 0.1 to about 10.0, preferably from about 0.2 to about 2.0; and hydrogen circulation of from about 100 to about 4,000 l./l., preferably from about 600 to about 2,000 l./l.

As apparent from the embodying examples of the present invention and a comparative example shown later, the most conspicuous effect of the present invention is detected in marked improvement of the viscosity index of the produced lubricating oil fraction in the hydrocracking.

Prescribing the pore structure of the catalyst as in the present invention not only influences the extent of cracking of hyrocarbons but also proves effective to prevent intrusion of asphalt, resin and other substances into the imsides of the pores. It also promotes selective ring-scission reactions of the condensed rings.

Figure 1:
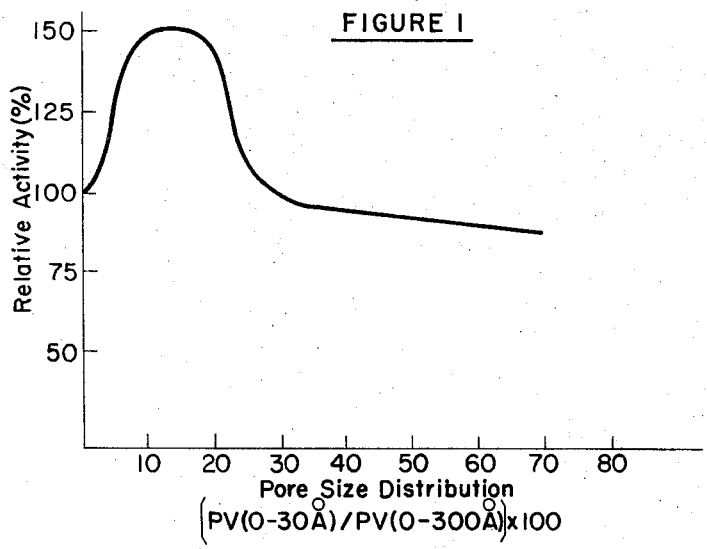
FIG. 1 is a graph showing the relationship between the percentage of the volume of the pores having a radius of from 0 to 30 A. to the volume of the pores having a radius of from 0 to 300 A.
Figure 2:
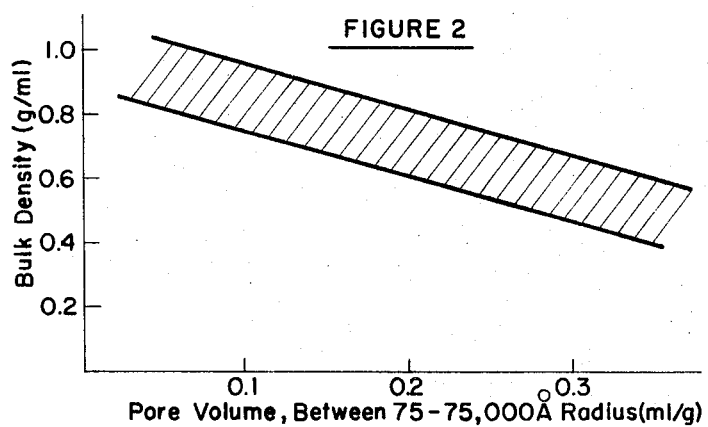
Figure 3:
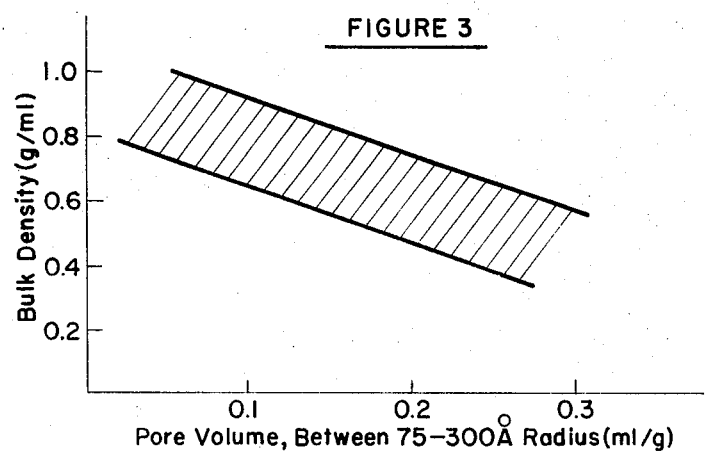

$$[(PV(0–30 \text{ A.})/PV(0–300 \text{ A.})] \times 100$$

and the relative activity;

FIG. 2 is a graph showing the relationship between the volume of the pores having a radius of from 75 to 75,000 A. and the bulk density;

FIG. 3 is a graph showing the relationship between the volume of the pores having a radius of from 75 to 300 A. and the bulk density.

PREFERRED EMBODIMENT

The invention will be more apparent from the preferred embodiment and working examples set forth hereinbelow.

DETERMINATION OF THE CATALYST PORE STRUCTURE

For measurement of the pore structure, it is advisable to use a gas adsorption method for the comparatively small pores of less than 300 A. in radius and a mercury porosimeter method for the comparatively large pores of greater than 300 A. in radius. (See P. H. Emmertt, "Catalysis," Vol. 1, p. 123, 1959 (Reinhold Publishing Corp.)).

In the present invention, a mercury porosimeter method (see "Catalytic Engineering (Shokubai Kogaku Koza)" Vol. 4, p. 70, 1964 (the Chijin Shokan & Co.)) was used for determination of the pores having sizes ranging from 300 to 75,000 A. in radius and a nitrogen gas adsorption method for the pores smaller than 300 A. in radius.

In the mercury porosimeter method, the contact angle of mercury relative to the catalyst was set at 140° and 480 dyne/cm. surface tension was given. It was presumed that all the pores were cylindrical in shape.

Concerning measurement of the pore size distribution according to the nitrogen gas adsorption method, various correction methods based on the principle of multimolecular adsorption have been proposed, among which the BJH method (E. P. Barrett, L. G. Joyner and P. P. Halenda, J. Amer. Chem. Soc. 73, 373 (1951)) and the CI method (R. W. Cranston and F. A. Inkley, "Advances in Catalysis," Vol. IX, p. 143, 1957 (New York Academic Press) have been most popularly employed. In the BJH method, four different correction factors of 0.90, 0.85, 0.80 and 0.75 are applied according to the degree of flexture of the pores, but this method has a drawback that reduced precision results particularly where the pores are smaller than 35 A. in radius.

The CI method uses the above-said correction factors as substantial variables to overcome the drawback of the BJH method. Although this CI method has a shortcoming in that the calculations involved are complicated, it is possible with this method (by using it usually on the adsorption side of the adsorption isotherm) to obtain a pore size distribution which is consistent with the specific surface area values obtained by the BET method and with the pore volume values obtained by the mercury-helium method.

The pore structure data used in the present invention were obtained by making calculations according to the DH method (D. Dollimore and G. R. Heal, J. Appl. Chem,. 14, 109 (1964)) by using the adsorption side of the adsorption isotherm.

The DH method is more simple in calculation formula than the CI method but is somewhat inferior to the latter method in accuracy. When the DH method is applied on the adsorption side of the adsorption isotherm, the obtained pore size distribution agrees very well with that obtained by the CI method. Each method for measurement of pore size distribution according to above-said gas adsorption principle employs Kelvin's equation of capillarity as the basic formula for calculation.

The results of measurement of pore structure, as used in the present invention, are therefore ones which were obtained by applying Kelvin's equation, as far as the pores of less than 300 A. in radius are concerned. Although Kelvin's equation tends to lose its accuracy as the pore diameter approaches the size of the pore-constituting atoms, no restriction will be imposed on the obtained results in actual applications if the measurement and calculation methods used are suitably selected.

As viewed above, there is provided according to the present invention a novel catalytic conversion method with high industrial merits, characterized in that a heavy hydrocarbon oil is contacted with hydrogen in the presence of a catalyst comprising a hydrogenating component composited on an alumina carrier containing 0 to 30% by weight of silica which has the following pore structural characteristics:

| Pore radius (A.) | Pore volume |
|---|---|
| 0–300 | Greater than 0.30 ml./g. |
| 75–75,000 | Less than 0.25 ml./g. |
| 0–30 | Less than 25 % of the volume of the pores with 0–300 A. in radius. |
| 75–300 | Less than 40% of the volume of the pores with 0–300 A. in radius. |

Example 1

Five types of alumina and silica base materials prepared by using aluminum sulfate, caustic soda and No. 3 water glass as main starting materials were subjected to the same extrustion molding machine so that they were shaped into 1.5 mm.-diameter cylindrical masses, which were then calcined to form carriers. Then, molybdenum and nickel were carried as metal components on said carriers to thereby obtain five types of catalysts. The results of determination of properties of these catalysts are shown in the following table.

| Properties | Catalysts | | | | |
|---|---|---|---|---|---|
| | A | B | C | D | E |
| Pore volume (ml./g.) (pore radius, A.): | | | | | |
| 0–30 | 0.0285 | 0.1509 | 0.1055 | 0.1500 | 0.1155 |
| 30–60 | 0.2040 | 0.1500 | 0.2430 | 0.1245 | 0.1568 |
| 60–90 | 0.1470 | 0.0398 | 0.0930 | 0.0158 | 0.0603 |
| 90–120 | 0.0780 | 0.0270 | 0.0335 | 0.0075 | 0.0343 |
| 120–150 | 0.0405 | 0.0098 | 0.0150 | 0.0030 | 0.0121 |
| 150–300 | 0.0300 | 0.0225 | 0.0200 | 0.0100 | 0.0380 |
| 300–75,000 | 0.0250 | 0.0450 | 0.0190 | 0.1200 | 0.1500 |
| 75–75,000 | 0.2335 | 0.1241 | 0.1175 | 0.1438 | 0.2620 |
| 0–75 | 0.3195 | 0.3209 | 0.4115 | 0.2870 | 0.3050 |
| 0–300 | 0.5280 | 0.4000 | 0.5100 | 0.3108 | 0.4170 |
| PV (0–30)/ PV (0–300)×100 | 5.4 | 37.7 | 20.7 | 48.3 | 27.7 |
| Total pore volume (ml./g.) | 0.5530 | 0.4450 | 0.5290 | 0.4308 | 0.5670 |
| Surface area (m.²/g.) | 181 | 277 | 283 | 225 | 261 |
| Bulk density (g./ml.) | 0.60 | 0.81 | 0.78 | 0.80 | 0.60 |
| Side crushing strength (kg./mm.) | 4.0 | 5.7 | 6.1 | 4.4 | 3.3 |
| Compositions (percent by weight): | | | | | |
| NiO | 4.8 | 4.0 | 5.0 | 3.6 | 12.0 |
| MoO₃ | 17.5 | 13.6 | 13.5 | 18.0 | 10.4 |
| SiO₂ | 19.2 | 17.9 | 19.0 | 21.1 | 18.5 |
| Al₂O₃ | Balance | Balance | Balance | Balance | Balance |

Catalyst A shown in the above table was then used under the following hydrocracking conditions to convert a vacuum distillate feedstock of Middle East Crude Oil having properties shown below, and the oil product then subjected to distillation to obtain a lubricating oil fraction with a boiling point of higher than 360° C. having the properties shown below.

Vacuum distillate of Middle East Crude Oil

| | |
|---|---|
| Specific gravity (15/4° C.) | 0.9264 |
| Visccosity (cst.): | |
| At 37.8° C. | 930.3 |
| At 98.9° C. | 86.7 |
| Viscosity index | 86.7 |
| Pour point (° C.) | −10 |
| Color (union) | 8(+) |

Hydrocracking conditions

| | |
|---|---|
| Temperature (° C.) | 396 |
| Pressure (kg./cm.²) | 100 |
| Liquid hourly space velocity | 0.5 |
| Hydrogen circulation (l./l.) | 1700 |

Produced lubricating oil fraction (With boiling point higher than 360° C.)

| | |
|---|---|
| Yield (volume percent) | 77.6 |
| Specfic gravity (15/4° C.) | 0.8900 |
| Viscosity (cst.) | |
| At 37.8° C. | 160.0 |
| At 98.9° C. | 15.2 |
| Viscosity index | 103.1 |
| Color (union) | 3(−) |
| Relative activity | 118.0 |

The relative activity was determined from the following formula:

$$\frac{O_s}{O_i} \times 100$$

Where $O_i$ is reactor holding time $(V/H/V)^{-1}$ over the catalyst
(i) tested and $O_s$ is reactor holding time for obtaining the same level of viscosity index as the catalyst (i) when using a reference catalyst.

EXAMPLES 2–6

Following the same procedure as in Example 1, catalytic activity of catalysts B–E (of Example 1) was compared with that of catalyst F (the properties of which are shown below). A lubricating oil fraction having the following characteristics was obtained.

360° C. (+) FRACTION OF PRODUCED OILS

| | Catalyst | | | | |
|---|---|---|---|---|---|
| | B | C | D | E | *F |
| Yield (volume percent) | 71.6 | 72.5 | 56.3 | 82.6 | 71.5 |
| Specific gravity (15/4° C.) | 0.8927 | 0.8822 | 0.8929 | 0.8933 | 0.8810 |
| Viscosity (cst.): | | | | | |
| At 37.8° C. | 209.8 | 131.5 | 191.2 | 242.8 | 122.5 |
| At 98.9° C. | 17.79 | 13.67 | 16.58 | 19.51 | 13.15 |
| Viscosity index | 99.8 | 107.2 | 98.6 | 99.2 | 108.6 |
| Color (union) | 3½ | 3(−) | 3½ | 3(+) | 3(−) |
| Relative activity | 96.6 | 136.6 | 92.6 | 95.3 | 152.0 |

*See the following:

| | Catalyst F |
|---|---|
| Pore volume (ml./g.) (pore radius Angstrom): | |
| 0–30 | 0.0572 |
| 30–60 | 0.2617 |
| 60–90 | 0.1063 |
| 90–120 | 0.0420 |
| 120–150 | 0.0215 |
| 150–300 | 0.0213 |
| 300–75,000 | 0.0200 |
| 75–75,000 | 0.1545 |
| 0–75 | 0.3755 |
| 0–300 | 0.5100 |
| PV (0–30)/(0–300)×100 | 11.2 |
| Total (pore volume (ml./g.) | 0.5300 |
| Surface area (m.²/g.) | 210 |
| Bulk density (g./ml.) | 0.69 |
| Side crushing strength (kg./mm.) | 5.3 |
| Compositions (percent by weight): | |
| NiO | 4.8 |
| MoO₃ | 13.5 |
| SiO₂ | 19.0 |
| Al₂O₃ | Balance |

Comparative Example

In a similar manner to that described in Example 1, except that a catalyst having the hereinbelow displayed properties was used, there was obtained a lubricating oil fraction boiling over 360° C. having the following properties.

| | |
|---|---|
| Yield (volume percent) | 80.0 |
| Specific gravity (15/4° C.) | 0.8911 |
| Viscosity (cst.): | |
| At 37.8° C. | 227.40 |
| At 98.9° C. | 18.87 |
| Viscosity index | 100.0 |
| Color (union) | 3(+) |
| Relative activity | 100 |

Catalyst properties

| Pore radius (A) | Pore volume (ml./g.) |
|---|---|
| 0–30 | 0.1300 |
| 0–300 | 0.4773 |
| 75–300 | 0.1105 |
| 75–75000 | 0.2400 |
| PV (0–30)/PV (0–300)×100 | 27.2 |
| Bulk density (g./ml.) | 0.57 |
| SiO₂ content (weight percent) | 16.0 |

As apparent from the foregoing, the catalysts A, C and F according to the present invention exhibit markedly improved activity as compared with the catalyst of the known properties (Comparative Example) and the catalysts B, D and E shown in Example 1 as comparative catalysts (not embraced within the present invention).

What is claimed is:
1. A process for the conversion of a heavy hydrocarbon oil comprising contacting said oil with hydrogen and a catalyst composite comprising a catalytic metal or compound thereof on a porous silica-alumina carrier having a silica content in the range of between 0 and about 30% by weight and further characterized in that:
   (1) the volume of the pores in said catalyst having a radius in the range of from about 0 to about 300 A. is greater than about 0.30 ml./g.;
   (2) the volume of the pores in said catalyst having a radius in the range of from about 0 to about 30 A. is less than about 25% of the volume of the pores having a radius in the range of from about 0 to about 300 A.;
   (3) the volume of the pores having a radius in the range of from about 75 to about 300 A. is less than about 40% of the volume of the pores having a radius in the range of from about 0 to about 300 A.; and
   (4) the volume of the pores having a radius in the range of from about 75 to about 75,000 A. is smaller than about 0.25 ml./g.

2. The process of claim 1 wherein said heavy hydrocarbon oil is a vacuum distillate, a residue, a reduced crude, an extract obtained from solvent extraction of a lubricating oil base stock, a cycle oil or mixtures thereof.

3. The process of claim 1 wherein said catalyst contains a metal, an oxide of a metal, a sulfide of a metal or mixtures thereof, and wherein said metal is selected from Group VI and/or VIII of the Periodic Table.

4. The process of claim 3 wherein said metal is selected from the group consisting of nickel, molybdenum, cobalt and mixtures thereof.

5. The process of claim 1 wherein said conversion process is hydrocracking and is conducted at a temeprature ranging between about 300 and 450° C., at a pressure ranging between about 50 and 300 kg./cm.², and at a liquid hourly space velocity ranging between about 0.1 and 10.0.

6. The process of claim 1 wherein said carrier of said catalyst also contains an additive selected from the group consisting of magnesia, titania, zirconia and mixtures thereof.

7. The process of claim 6 wherein said additive comprises between about 1 and 30 wt. percent of the carrier.

References Cited

UNITED STATES PATENTS

| | | | |
|---|---|---|---|
| 3,531,398 | 9/1970 | Adams et al. | 208—216 |
| 3,668,116 | 6/1972 | Adams et al. | 208—216 |
| 3,622,500 | 11/1971 | Alpert et al. | 208—111 |
| 3,730,879 | 5/1973 | Christman et al. | 208—210 |

DELBERT E. GANTZ, Primary Examiner

G. E. SCHMITKONS, Assistant Examiner

U.S. Cl. X.R.

208—112, 143; 252—455 R, 477 R